(12) United States Patent
Horstmann et al.

(10) Patent No.: US 8,225,713 B2
(45) Date of Patent: Jul. 24, 2012

(54) BALING PRESS FOR LARGE BALES

(75) Inventors: Josef Horstmann, Ibbenbüren (DE); Klaus Martensen, Hörstel (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 104 days.

(21) Appl. No.: 12/833,022

(22) Filed: Jul. 9, 2010

(65) Prior Publication Data
US 2011/0005410 A1 Jan. 13, 2011

(30) Foreign Application Priority Data
Jul. 10, 2009 (DE) .................. 10 2009 032 800

(51) Int. Cl.
B65B 13/02 (2006.01)
B65B 13/26 (2006.01)
A01F 15/14 (2006.01)

(52) U.S. Cl. .................. 100/3; 100/6; 100/33 R; 56/341
(58) Field of Classification Search .................. 100/3, 6, 100/8, 18, 19 R, 24, 31, 33 R; 56/341–343
See application file for complete search history.

(56) References Cited

U.S. PATENT DOCUMENTS

| | | | | | |
|---|---|---|---|---|---|
| 2,413,378 | A | * | 12/1946 | Raney | 100/21 |
| 3,942,429 | A | * | 3/1976 | Schmalz et al. | 100/26 |
| 5,009,062 | A | * | 4/1991 | Urich et al. | 56/341 |
| 5,174,198 | A | * | 12/1992 | Bolstad | 100/3 |
| 2004/0187468 | A1 | * | 9/2004 | Krone et al. | 56/341 |
| 2005/0110276 | A1 | | 5/2005 | Rotole | |

FOREIGN PATENT DOCUMENTS

| | | |
|---|---|---|
| DE | 2831315 A1 | 2/1980 |
| DE | 19520751 A1 | 12/1996 |
| DE | 29719715 U1 | 5/1999 |
| DE | 20317302 U1 | 3/2003 |
| DE | 102007015649 A1 | 10/2008 |
| EP | 0429789 A1 | 6/1991 |
| EP | 0880886 A2 | 12/1998 |

* cited by examiner

Primary Examiner — Jimmy T Nguyen
(74) Attorney, Agent, or Firm — Gudrun E. Huckett

(57) ABSTRACT

A baling press for producing large square high-density bales has a pick-up device picking up crop, a cutting device downstream of the pick-up device, a conveying device downstream of the cutting device, and a pressing channel disposed downstream of the conveying device and receiving the crop from the conveying device. The crop is shaped to high-density bales in the pressing channel. A tying device is provided that, for ensuring a permanent cohesion of the bales and completing the bales, ties tying medium strands, connected in endless loops, in longitudinal direction of the bales about the bales. A spacing of outermost tying medium strands, disposed next to outer parallel longitudinal bale edges, relative to the outer parallel longitudinal bale edges, respectively, is at least as large as or greater than an average spacing between neighboring tying medium strands in a transverse direction transverse to the longitudinal bale edges.

8 Claims, 4 Drawing Sheets

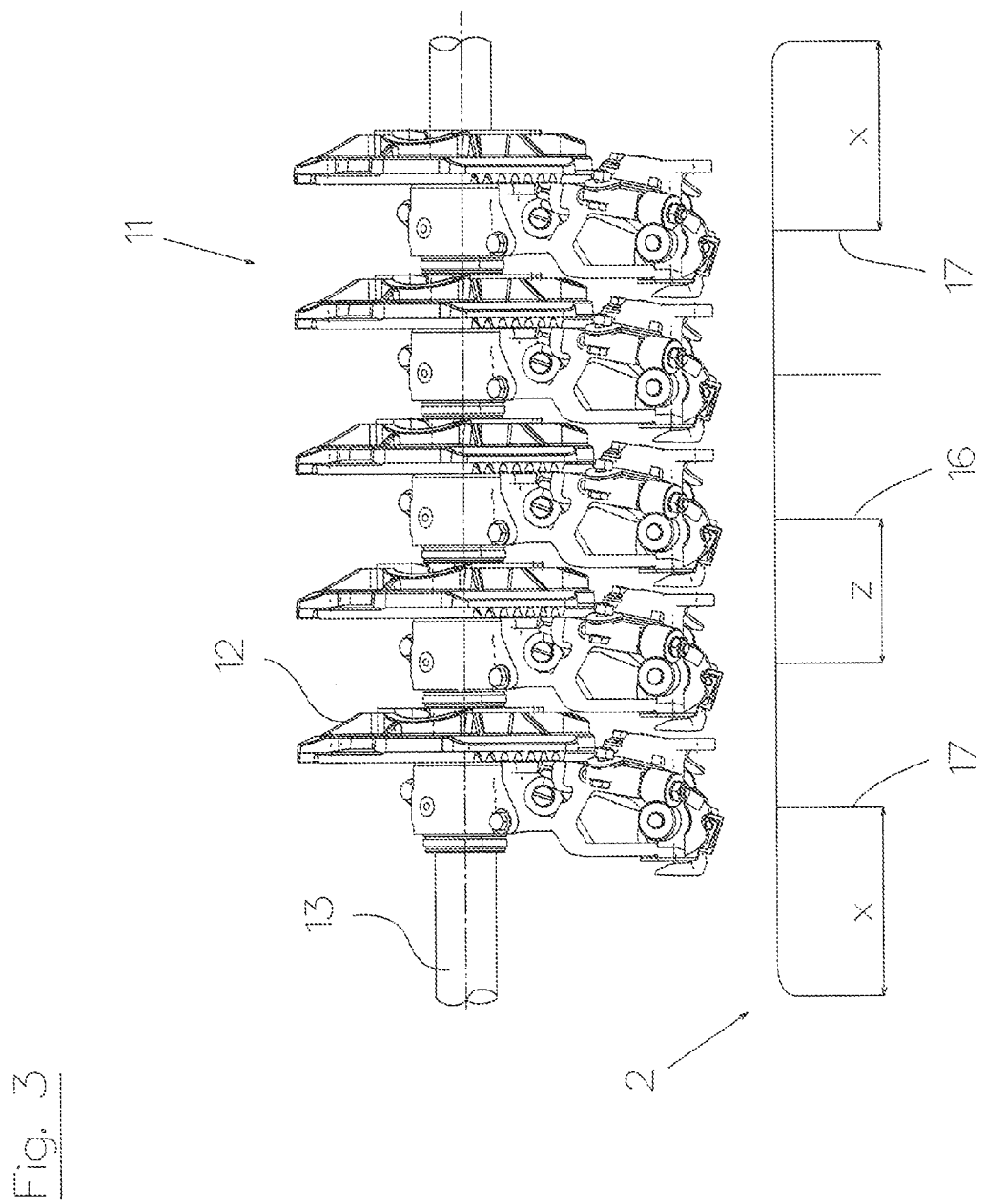

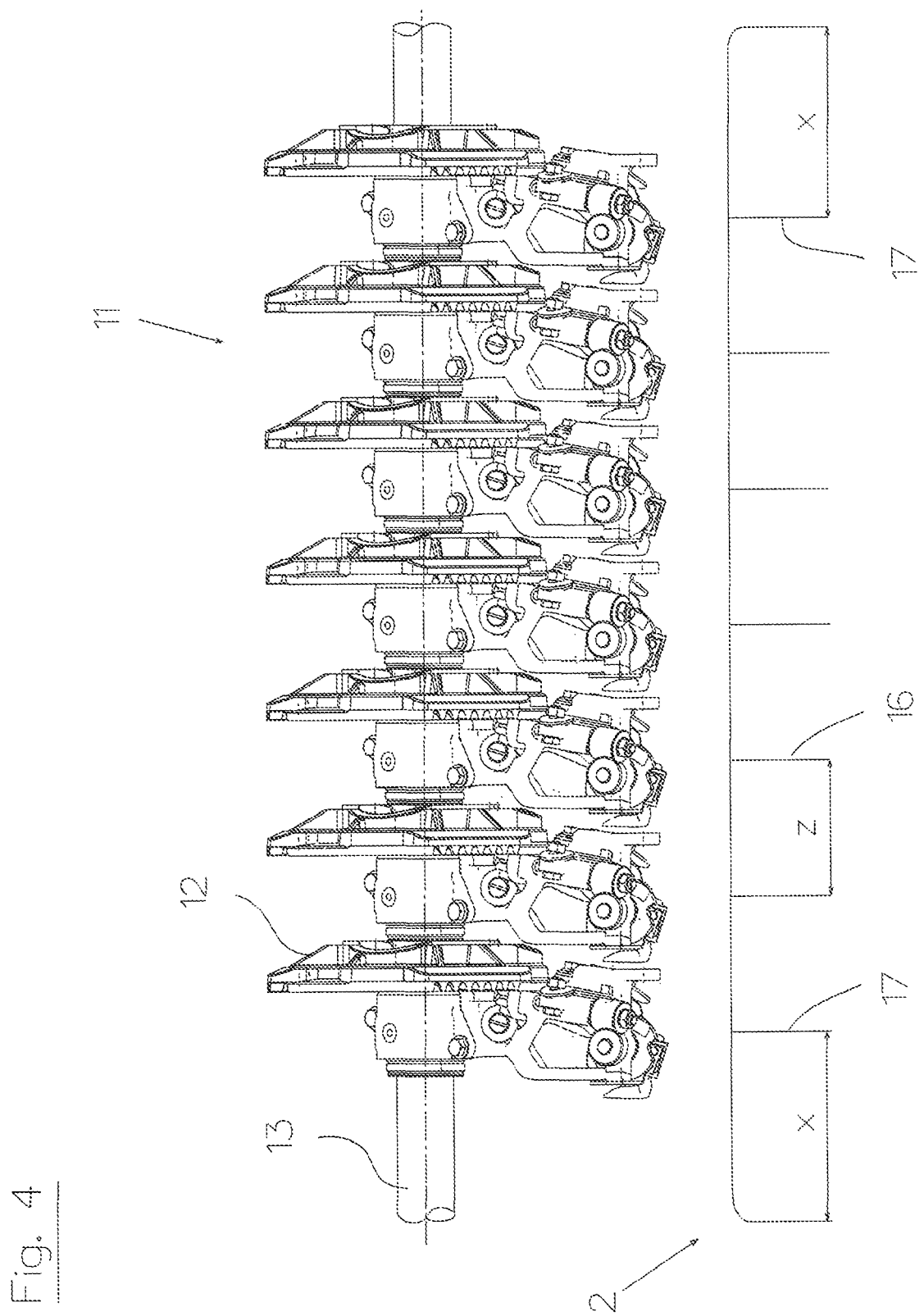

BALING PRESS FOR LARGE BALES

BACKGROUND OF THE INVENTION

The invention relates to a baling press for large bales (large baler) for producing square high-density bales, in particular, agricultural crop bales, wherein the baling press is a self-propelled harvesting machine or a harvesting machine that is connected to a tractor and driven by the tractor. The baling press or baler picks up crop by means of pick-up and conveying devices and supplies crop to a pressing channel in which the crop is shaped to high-density bales. The bales are then tied in the longitudinal direction of the bale by several tying strands in order to ensure a permanent cohesion of the bales, wherein the tying strands for finishing the bales are connected to endless loops.

Such baling presses (balers) for large bales are known in various embodiments, sizes and drive variants.

However, on the market almost exclusively those balers are available that are connected to a tractor and are mechanically driven by the tractor wherein the compressed bales for permanent cohesion are preferably tied by several strands of twine that, before ejecting the bales from the baler, are knotted by means of a knotting device.

Square high-density bales are distinguished from round bales by a high uniform strength and stability and by their shape so that, inter alia, especially the transportation and storage conditions are very beneficial. In particular in the recent past, as straw is being used more and more as a raw material and an energy source and therefore must be transported often across large distances, the requirements put on baling presses for large bales have changed greatly. The profitability of stalk fodder harvesting and the profits from selling straw greatly depend on the harvesting, transporting and storage costs. Precisely based on this, special requirements are put on the baler technology. Highest tonnage in smallest space and particularly durable and shape-stable large bales are required even for crop that is cut to very short pieces or even crop that has been chopped.

Handling of such large and heavy bales does not present a limit as a result of professional loading technology, for example, wheel loaders or telehoist load luggers, used commonly nowadays. When producing such highly compressed and large size bales, one pushes on toward yet unreached dimensions with respect to the drive power and in particular with respect to the forces acting within the large balers. As a solution to these problems, in the publication DE 10 2007 015 649 A1, for example, a large baling press for producing extremely highly compressed bales is disclosed that, for reducing load on the tractor driving the baler, is provided with an additional hydraulic starter device for assisting in starting the machine.

Another limit encountered upon producing extremely highly compressed bales is tying of the bale for the purpose of its permanent safe cohesion.

Particularly in the field of stationary industrial baling presses for various materials, publications and attempts are known where an increased strength and stability is to be obtained in that other tying means, such as plastic strip or steel strip, and alternative joining methods using joining means such as gluing, welding are employed or additional tying means are used. In the field of large balers for agricultural crop, none of these solutions has however been accepted as preferable to knotting twine.

The high economic feasibility offered by the relatively minimal tying medium costs and short processing times and the processing safety of the knotting process, given the special conditions of a mobile harvesting machine, on the one hand, and the innocuous character of the twine knots in regard to risks to animal health and the environment, on the other hand, favor this method.

It is therefore the object of the present invention to improve a large baler for producing square high-density bales, in particular agricultural crop bales, in such a way that a permanent and shape-stable cohesion of the bales is ensured even for extreme increase of the pressing forces and thus of the strength and stability of the bales and for short-piece material to be pressed.

SUMMARY OF THE INVENTION

In accordance with the present invention, this is achieved in that the spacings or distances of the outermost tying medium strands relative to the immediately adjacent outer parallel longitudinal bale edge is at least of the same size or is greater than the average spacing of neighboring tying medium strands relative to one another.

According to the invention, a large baling press is provided in which the number of tying medium strands that has been commonly used up to now is supplemented by at least one further tying medium strand in accordance with the features defined by the present invention. In a large baling press with a twine tying device this means that at least one further knotter is added to the existing and generally known knotters and in this way the load acting on the individual twine strand and in particular on the weak point in the form of the knot is reduced. Since advantageously the knotters of the tying device are arranged adjacent to one another on a common drive shaft, the minimal width of a knotter is also the limiting factor for the minimal spacing of the twine strands. An arrangement of the knotting apparatus on at least two drive shafts that are displaced relative to one another for further reducing the twine spacings is theoretically conceivable but in practice is hardly realizable because of the unacceptable technical expenditure that is required for this purpose.

By means of different constructive modifications of the generally known knotting apparatus employed up to now, a reduction of the minimal spacing is however possible. Thoughtful considerations and experiments have also discovered a further limiting factor for the maximum number of tying medium strands in producing square large bales. In order to ensure in all conventional methods of bale handling a safe hold of the outer tying strands, it is of utmost importance to maintain a minimum spacing of the outer tying strands relative to the longitudinal bale sides to which the tying strands extend parallel.

When the spacing is too small, sliding off of the tying strands is easily possible, for example, in case of a sub-optimal shaping of the bale edges or upon bale handling during the time from pick-up at the field, transport, and unloading at the site of consumption.

Based on these considerations, the features according to the invention have been developed which relate the spacing of the tying strands that are positioned closest to the outer longitudinal edges of the bale to the spacings of the tying strands relative to one another. Since the spacing of the tying strands relative to one another must not be mandatorily identical, the average spacing is therefore used in this connection.

Accordingly, by means of the invention a significantly improved large baling press is provided that with minimal extra expenditure enables a substantially more economic crop collection by producing crop bales that are optimized relative to crop density in the bale and shape stability of the bale.

BRIEF DESCRIPTION OF THE DRAWING

FIG. 3 shows five knotters arranged on a common shaft.

FIG. 4 shows seven knotters on a common shaft.

DESCRIPTION OF THE PREFERRED EMBODIMENTS

Figure 1:
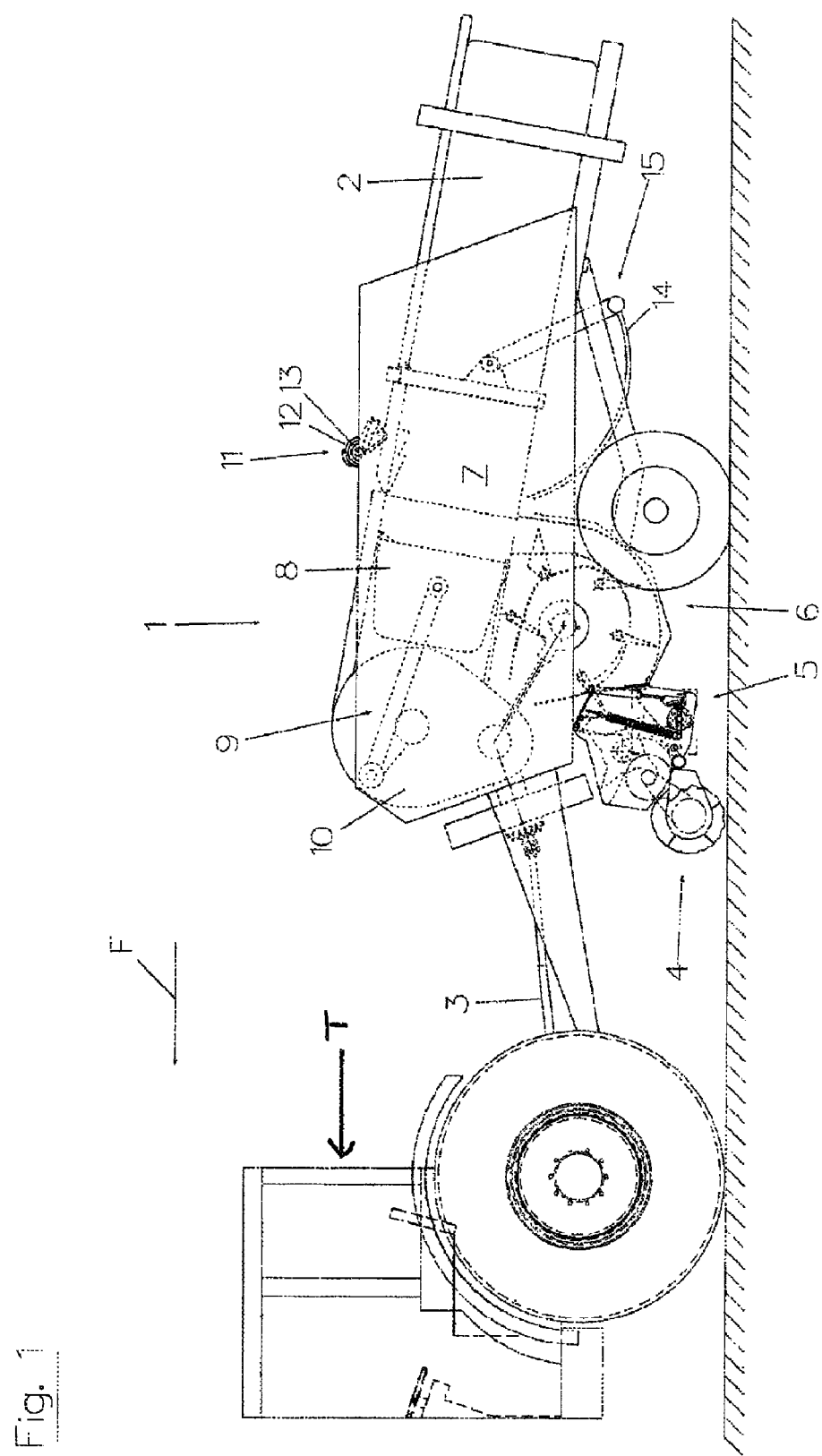
FIG. 1 is a schematic side view of a large baling press as a whole that produces square high-density square bales.

FIG. 1 shows an agricultural large baling press (large baler) 1 for producing square compressed bales 2 of agricultural crop. The baling press 1 is pulled by an agricultural tractor T (illustrated only schematically in FIG. 1) or a similar motor tractor and is driven by means of a drive shaft 3. The baling press 1 comprises in the front area a pick-up device 4 for picking up the crop from the ground. Downstream thereof are a cutting device 5 and a conveying device 6, supplying the processed crop into a pressing channel 7. In the pressing channel 7 a pressing piston 8 is reciprocatingly arranged wherein the drive action is realized by means of crank gear 9 of a main gear apparatus 10. A reciprocating movement of the pressing piston 8 in the pressing channel 7 is referred to as pressing piston stroke. When the machine is operated at full capacity, before each pressing piston stroke a pre-compressed package of crop is conveyed by the conveying device 6 into the pressing channel 7 and is pushed to the rear by the pressing piston 8, moving opposite to the travel direction F and is thus compressed. Above the pressing channel 7 there is a tying device 11 in the form of a knotting device that is comprised of several knotters 12 arranged in a row adjacent to one another. The knotters 12 are supported on a common knotter shaft 13 that is horizontal and oriented transverse to the length of the pressing channel 7 and thus the bale length. The knotters 12 are commonly driven by the knotter shaft 13.

Below the pressing channel 7 for each knotter 12 there is a needle 14 that serves for supplying the tying medium to the knotters 12 at the beginning of the tying process. The needles 14 are secured on a common needle frame 15 and, for ensuring the required synchronization of the sequences of the knotting process, are in a driving connection with the knotter shaft 13.

In regard to the tying process by means of which the tying twine strands are fastened to endless loops about the completed bales 2 by the knotters 12 in order to secure in this way the bales 2 permanently in the highly compressed state, a differentiation between two basic systems can be made: the single knot system and the double knot system. In the single knot system, the tying medium and the knotters are increasing loaded and stressed with increasing bale dimensions and compression level of the bales during the pressing process, and limits of the durability are reached. As a result of this, especially for increasing the tying reliability of large high-density bales the double knot system has been developed. A characteristic feature of this tying process is that the tying twine wound about the compressed bale is tied by two knots instead of a single knot. During the pressing process the bale is supplied with an upper tying twine and a lower tying twine. Both twines are knotted at the beginning and at the end of the respective bale at the topside of the bale. In case of large balers for square, highly compressed crop bales as those illustrated in FIG. 1, this system has met with great acceptance and is widely used. Since the characterizing features of the present invention are however independent of the tying system of the large baling press no further explanation in this respect is needed.

As already mentioned in the beginning, as a result of the aforementioned requirements certain standardized bale sizes have been developed inter alia. For example, the bales 2 of FIG. 2, produced by means of the large baling press 1 of FIG. 1 according to the invention, have for example the very commonly used bale width b of 1,200 mm. Up to now, only baling presses are known that operate for this bale width with a maximum of six knotters 12 and therefore tie the bales with six tying medium strands 16.

Figure 2:
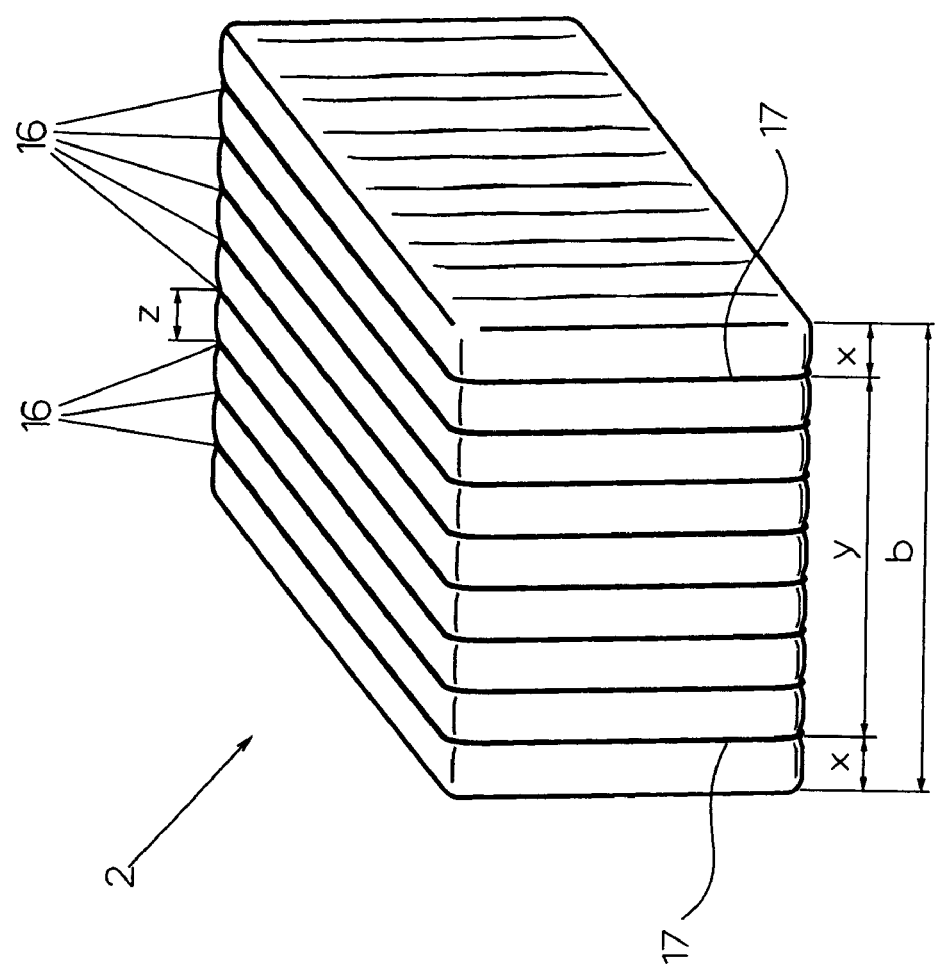
FIG. 2 is a perspective view of a high-density bale that is produced with the large baling press according to the present invention.

The bale 2 of FIG. 2 manufactured by the baling press 1 according to the invention has for the first time in accordance with the invention more than six, i.e., even eight tying medium strands 16. By means of the advantageous addition of at least one further tying medium strand 16 for tying the bale 2, on the one hand, even higher bale compression levels are enabled and, on the other hand, in this way the permanent cohesion of the bales is reliably ensured while in case of prior tying processes already the durability limits of the twine strands 16 and in particular of the knots had already been reached. Experiments in regard to achieving these advantages, for example, by using tying medium that is thicker or has a higher quality, were not successful as the technical and economic disadvantages caused by these solutions outweigh the benefits.

The distribution of the twine strands 16 across the bale width b in the prior art is determined by two parameters. In order to obtain a cleanly shaped bale that after leaving the pressing channel of the baler will not expand excessively especially at the outer edges and lose its precise dimensions, the outer twine strands 17 that extend in longitudinal direction of the bale parallel to the outer edges of the bale must not be too far removed from the bale edges. In this way, between the two outer tying medium strands 17 there is an area y that can be provided with a number of tying medium strands that is determined by the width of the knotters that are advantageously positioned adjacent to one another on a knotter shaft. Accordingly, for a bale width b of 1,200 mm a number of six tying medium strands 16 has been provided in the past.

According to the present invention the use of modified knotters of a more narrow construction and various modifications on the large baling press required due to the constructional modifications of the knotters, it has been achieved to provide a large baling press that produces bales 2 with significantly improved properties. In particular, by realizing the outer twine strand spacings x to be identical to z or greater than z wherein z is the spacing of the twine strands 16 relative to one another, it is now advantageously possible by addition of at least one additional tying medium strand 16 to provide a solution with respect to the market demand for bales that are ever more highly compressed and permanently shape-stable.

By taking into consideration the aforementioned equation for x and z it is thus possible with the large baling press of the illustrated embodiment to produce a bale 2 with a width b of 1,200 mm with eight tying medium strands 16 without there being the risk that the outer strand 17 as a result of a spacing x that is too small will slide off the bale 2. The crop bales produced by the baling press, for a bale width of approximately 800 mm, have at least five tying medium strands, i.e., the tying device, for a bale width of approximately 800 mm, has at least five knotters. The crop bales produced by the baling press, for a bale width of approximately 1,200 mm, have at least seven tying medium strands, i.e., the tying device, for a bale width of approximately 1,200 mm, has at least seven knotters. In FIG. 2 it can be easily seen that the spacing z of an outer twine strand 17 affects the strand 17 with respect to its hold on the bale such that the outer spacing x is also affected. The tighter the next twine strand 16 to the outer twine strand 17, the smaller the spacing x to the outer bale edge may be. This finding and the thus derived equation apply of course also in the same way to any other bale size. Preferably, the spacing x is 120 mm to 160 mm.

The specification incorporates by reference the entire disclosure of German priority document 10 2009 032 800.9 having a filing date of Jul. 10, 2009.

While specific embodiments of the invention have been shown and described in detail to illustrate the inventive principles, it will be understood that the invention may be embodied otherwise without departing from such principles.

What is claimed is:

1. A baling press for producing large square high-density bales, the baling press comprising:
    a pick-up device picking up crop;
    a cutting device downstream of the pick-up device receiving the crop from the pick-up device;
    a conveying device downstream of the cutting device receiving the crop from the cutting device;
    a pressing channel disposed downstream of the conveying device and receiving the crop from the conveying device;
    wherein the crop is shaped to high-density bales in the pressing channel;
    a tying device that, for ensuring a permanent cohesion of the bales and completing the bales, ties tying medium strands, connected in endless loops, in longitudinal direction of the bales about the bales;
    wherein the tying device
        for a bale width of approximately 800 mm, has at least five knotters and the bales produced by the baling press have at least five tying medium strands; or
        for a bale width of approximately 1,200 mm, has at least seven knotters and the bales produced by the baling press have at least seven tying medium strands;
    wherein a spacing of outermost tying medium strands, disposed next to outer parallel longitudinal bale edges, relative to the outer parallel longitudinal bale edges, respectively, is at least as large as or greater than an average spacing between neighboring tying medium strands in a transverse direction transverse to the longitudinal bale edges.

2. The baling press according to claim 1, wherein the tying device is a knotting device that ties the tying medium strands to form the endless loops.

3. The baling press according to claim 2, wherein the knotting device connects the tying medium strands by knots to form the endless loops.

4. The baling press according to claim 2, wherein the tying medium strands are comprised of tying twine.

5. The baling press according to claim 1, wherein the tying device comprises a knotter shaft and all of the knotters are arranged on the knotter shaft, wherein the knotter shaft is arranged in the transverse direction at the pressing channel.

6. The baling press according to claim 1, wherein the spacing of the outermost tying medium strands to the outer parallel longitudinal bale edges is in a range of 120 mm to 160 mm.

7. The baling press according to claim 1 embodied as a self-propelled harvesting machine.

8. The baling press according to claim 1 embodied as a harvesting machine attached to and driven by a tractor.

* * * * *